United States Patent Office 3,116,791
Patented Jan. 7, 1964

3,116,791
SECONDARY RECOVERY OF PETROLEUM
Burton B. Sandiford, Placentia, and Howard F. Keller, Jr., Fullerton, Calif., assignors to Union Oil Company of California, Los Angeles, Calif., a corporation of California
No Drawing. Filed Dec. 10, 1957, Ser. No. 701,724
13 Claims. (Cl. 166—9)

This invention relates to the secondary recovery of petroleum from subterranean formations, and in particular concerns an improved water flooding process.

The technique of water flooding to recover oil from so-called "depleted" reservoirs is well known. In general, such process consists in introducing an aqueous medium into one or more injection wells which penetrate the "depleted" formation, and forcing such medium through the formation toward one or more production wells which likewise penetrate the formation. In the so-called "five-spot drive," the aqueous medium is forced down four injection wells which are more or less symmetrically located around a producing well. As the flooding medium passes through the formation it displaces the residual oil therein and carries it into the producing well from which it is recovered by conventional means. In order to insure that the flooding medium advances through the formation to the production well with a more or less plane front (rather than in the form of fingers extending through the strata of highest permeability) it has been proposed that the viscosity of at least the forward portion of the flooding medium be greater than that of water or brine and, in some cases, equal to or greater than that of the oil to be recovered. This has been accomplished by adding a viscosity-increasing agent to at least the initial portion of the flooding medium. Fatty acid soaps, alginates, sucrose, glycerine, carboxymethylcellulose and water-soluble polymers such as polyvinyl and polyallyl alcohols have been suggested for use as such agents in aqueous flooding media. Certain of such agents, however, precipitate from solution when exposed to typical reservoir temperatures and/or to the anions or cations normally present in subterranean formations, whereas others must be employed in very large amounts to secure the desired increase in viscosity. Still others tend to plug the interstices of the formation even though they are apparently completely soluble in water and no precipitating metal ions are present.

The present invention is based on our discovery that certain water-soluble alkylene oxide polymers are particularly well adapted for use as viscosity-increasing additives in aqueous flooding media, and that increased recovery of oil can be realized by the above-described flooding or driving techniques employing a viscous aqueous solution of such polymers as the flooding or driving medium. The alkylene oxide polymers which are employed in accordance with the invention are exceptionally stable with respect to precipitation from aqueous solutions by the elevated temperatures and/or mineral anions and cations encountered in subterranean formations, and relatively small amounts are effective in achieving the desired increase in the viscosity of the water. Moreover, they are remarkably free from any tendency to plug the interstices of even exceptionally "tight" formations. The invention thus consists in a secondary recovery process in which a flooding medium consisting essentially of a viscous aqueous solution of a water-soluble alkylene oxide polymer of the type hereinafter described is injected into an input well which penetrates an oil-bearing formation and is thereafter forced through said formation toward an output well penetrating the same. In the interests of economy it is preferred to employ the viscous flooding medium as a relatively small volume plug in advance of a conventional non-viscous flooding medium, e.g., water or brine.

The alkylene oxide polymers which are employed in accordance with the invention are water-soluble polymers of ethylene oxide, a propylene oxide or a butylene oxide, e.g. 1,2-propylene oxide, trimethylene oxide, isobutylene oxide, 2,3-epoxybutane, 1,2-epoxybutane, having molecular weights such that a 5 percent by weight aqueous solution of the same has a viscosity of at least about 200 centipoises at 20° C. As is well known (see Ellis, "The Chemistry of Synthetic Resins," vol. II, pp. 990–992) polyethylene oxide, which is representative of the present class of alkylene oxide polymers, has the molecular structure:

$$HO-C_2H_4-O-[C_2H_4-O-]_x-C_2H_4OH$$

wherein $x$ represents the degree of polymerization. The present polymers are thus quite distinct from the surface active products obtained by etherifying a phenol with an alkylene oxide. The present polymers are colorless thermoplastic resins, soluble in halogenated organic solvents as well as in water, and have a highly ordered crystalline structure. They are obtained by subjecting the monomeric alkylene oxide, usually in admixture with a diluent such as butane, to somewhat elevated temperatures in the presence of an active alkaline-earth metal carbonate catalyst. Alkaline-earth derivatives of organic mono- and polyhydroxy compounds, e.g. strontium methylate, calcium glycolate, etc., may also be employed as catalysts. The polymers range in molecular weight from as low as 50,000 up to several million, and the viscosity of their aqueous solutions vary accordingly from as low as about 200 centipoises at 5 percent concentration to as high as 7000 or more centipoises at 1 percent concentration. Being entirely non-ionic they are entirely stable with respect to precipitation from aqueous solution by anions or cations. Unlike certain other water-soluble polymers which have been suggested for use in water flooding, they are of exceptionally uniform composition and contain no difficultly-soluble "deadheads" which plug the minute pores of subterranean formations. Neither do they display any tendency to become adsorbed on the surfaces of such pores. While any of such polymerized alkylene oxides may be employed in the practice of the invention, it is preferred to employ polymerized ethylene oxide of such molecular weight that a 1 percent by weight aqueous solution of the same has a viscosity between about 500 and about 4000 centipoises at 20° C. Such a product is available commercially under the general trade name "Polyox" (Union Carbide Chemicals Co.) and can be obtained in several specific viscosity grades.

In addition to the alkylene oxide homopolymers referred to above there may also be employed copolymers of such alkylene oxides with other epoxy compounds, etc. The term "polymer of an alkylene oxide" is herein employed to designate the aforementioned homopolymers as well as such copolymers of the present alkylene oxides with other polymerizable epoxy compounds, e.g., the epoxybutanes, butadiene oxide, styrene oxides, etc.

The amount of polymer employed in practicing the process of the invention should be such that the viscosity of the aqueous flooding medium at the reservoir temperature is at least about 1 centipoise and is preferably at least of the same order of magnitude as that of the residual oil in the formation, e.g., between about 10 and about 1000 centipoises. The exact amount required is dependant upon the molecular weight of the polymer and the orientation therein of the alkylene oxide units, as well as upon the presence or absence of other additives in the flooding medium. Usually, however, such amount represents between about 0.02 and about 1.5 percent by weight of the entire composition. In accordance with conventional water flooding practice the flooding medium may optionally contain minor amounts of other additives adapted to impart specific desirable properties to the medium. Among such optional additives there may be mentioned surface active or wetting agents, e.g., alkyl pyridinium salts, sorbitan monooleate, quaternary ammonium compounds and the like, which are provided for the purpose of improving the contact between the aqueous flooding medium and the oil-wet particles of the formation; bactericides such as chlorinated phenols, aldehydes, and the like, which serve to prevent bacterial growth from clogging the interstices of the formation; corrosion inhibitors; etc.

In carrying out the process of the invention, conventional water flooding procedure is employed, i.e., the injection and production wells are suitably fitted with packers if required, and the viscous flooding medium is forced down the injection well and out into the reservoir by means of conventional pumping equipment located at the well head. As previously stated, in the interests of economy it is preferred to employ the viscous flooding medium only to form a flooding front and to follow the viscous medium with ordinary flooding water. According to such preferred mode of operation, after the viscous medium has been forced into the injection wells for a period of time sufficient to insure an adequate thickness of viscous flooding front within the formation, its supply is cut off and ordinary flooding water is substituted therefor. The amount of viscous medium necessary to provide a flooding front of adequate thickness will depend upon the distance between the injection and producing wells and their spacing, as well as upon the porosity of the intervening formations. Desirably, the volume of viscous flooding medium should correspond to between about 1 and about 10 percent of the volume of the hydrocarbon pore space of the formation, although larger volumes may be employed.

In order to demonstrate the improved results attained through the use of the present alkylene oxide polymers in accordance with the process of the invention, and to provide a reliable means for comparing the efficiency of such polymers with other viscosity-increasing agents, the following test procedure has been employed: A core sample, about 1" in diameter by about 6" in length, is mounted in a core holder equipped with pressure fittings on its opposite ends so that desired liquids can be forced lengthwise through the core. The latter is initially saturated with a simulated oil field brine consisting of a 3 percent aqueous solution of sodium chloride, after which a hydrocarbon oil is forced into one end of the core until brine is no longer forced out of the core at the opposite end. The volume of oil thus forced into and retained within the core sample is noted and designated $V_0$. The core sample so prepared is referred to as a "restored state" core since it simulates the saturation condition which prevailed in the original formation. A simulated conventional flooding operation is then carried out by forcing a conventional flooding medium (which may be water or brine) through the core until breakthrough occurs. The volume of oil which is thereby forced from the discharge end of the core is determined and designated $V_1$. The simulated flooding operation is then continued until oil is no longer forced from the discharge end of the core. The total volume of oil thus forced from the core is determined and designated $V_2$. The efficiency of the operation up to breakthrough is calculated as follows $$\frac{V_1}{V_0} \times 100 = E_B$$

and the overall efficiency is calculated as $$\frac{V_2}{V_0} \times 100 = E_0$$

Oil is again forced through the core until the flooding medium is no longer forced from the discharge end of the core, and the amount of oil thus retained within the core is determined and designated $V_0'$. The simulated flooding operation is then repeated with the viscous test medium substituted for the conventional flooding medium, and the amount of test medium forced into the core up to breakthrough is determined and designated $V_1'$. Also, the amount of the test flooding medium forced into the core until oil is no longer forced from the discharge end thereof is determined and designated $V_2'$. The breakthrough and overall efficiencies are calculated as $E_B'$ and $E_0'$ as previously explained. The ratios $E_B'/E_B$ and $E_0'/E_0$ are a measure of the improvement in oil recovery secured by use of the viscous test medium.

The following table sets forth the data obtained by subjecting a typical alkylene oxide polymer of the present class and several of the prior art viscosity-increasing additives to the foregoing test procedure.

| Test No. | Test material | $E_B$ | $E_0$ | $E_B'$ | $E_0'$ | $E_B'/E_B$ | $E_0'/E_0$ | Remarks |
|---|---|---|---|---|---|---|---|---|
| 1 | 0.4% aqueous solution of "Polyox",[1] visc.=27 cps.; Sandstone core; visc. of oil=237 cps. | 17.8 | 41.7 | 25.2 | 71.0 | 1.42 | 1.70 | Completely free from plugging. |
| 2 | 2% aqueous polyvinyl alcohol, visc.=4.6 cps.; Sandstone core; visc. of oil=2 cps. | 49.0 | 51.0 | 55.0 | 55.0 | 1.04 | 1.08 | Test solutions foamed badly, and gradually plugged core. |
| 3 | 1% aqueous methylcellulose, visc.=30 cps.; Sandstone core; visc. of oil=207 cps. | 23.0 | 67.0 | 0.5 | | 0.22 | 0 | Core completely plugged by test medium. |

[1] Union Carbide Chemicals Compony polymerized ethylene oxide; visc. of 1% aqueous solution=3000 cps.

Of the various materials suggested by the prior art as viscosity-increasing additives for aqueous flooding media, polyvinyl alcohol is the most closely related to the alkylene oxide polymers which are employed for such purpose in accordance with the present invention. However, as is established by the experimental data tabulated above, when an aqueous solution of polyvinyl alcohol is forced through an oil sand the polyvinyl alcohol precipitates in solid form and gradually plugs the sand to shut off the flow of fluids therethrough. Also, polyvinyl alcohol is not particularly effective for increasing the viscosity of water; in the tests referred to above, a 2 percent aqueous solution of the same had a viscosity of only 4.6 cps. Clearly, if viscosities of the order of 10–1000 cps. are to be attained it will be required to employ an uneconomically large amount of polyvinyl alcohol. Also, polyvinyl alcohol solutions have a tendency to foam, which makes such solutions difficult to handle, and furthermore, decreases the efficiency of oil displacement. It may also be noted that methylcellulose, which has also been suggested as a viscosity-increasing additive, was found to be even less satisfactory than ordinary brine since it precipitated from solution within the core and completely plugged the same.

Other modes of applying the principle of our invention may be employed instead of those explained, change being made as regards the methods or materials employed provided the step or steps stated by any of the following claims, or the equivalent of such stated step or steps, be employed.

We, therefore, particularly point out and distinctly claim as our invention:

1. The process for recovering oil from a subterranean oil-bearing formation which comprises introducing into an input well penetrating said formation a flooding medium consisting essentially of an aqueous solution of a water-soluble polymer of an alkylene oxide selected from the class consisting of ethylene oxide, the propylene oxides and the butylene oxides, and forcing said medium through said formation toward at least one output well penetrating said formation at a distance from said input well, said polymer having a molecular weight such that a 5 percent by weight aqueous solution thereof has a viscosity of at least about 200 centipoises at 20° C. and said polymer being employed in such amount that the said flooding medium has a viscosity of at least about 1 centipoise at the formation temperature.

2. The process of claim 1 wherein the said polymer is a water-soluble homopolymer of an alkylene oxide selected from the class consisting of ethylene oxide, the propylene oxides and the butylene oxides.

3. The process of claim 1 wherein the said polymer is a water-soluble homopolymer of ethylene oxide.

4. The process of claim 1 wherein the said polymer is employed in such amount that the viscosity of the said flooding medium at the formation temperature is between about 10 and about 1000 centipoises.

5. The process of claim 3 wherein the said polymer has a molecular weight such that a 1 percent by weight aqueous solution thereof has a viscosity between about 500 and about 4000 centipoises at 20° C.

6. The process for recovering oil from a subterranean oil-bearing formation which comprises introducing into an input well penetrating said formation a flooding medium consisting essentially of an aqueous solution of a water-soluble polymer of an alkylene oxide selected from the class consisting of ethylene oxide, the propylene oxides and the butylene oxides, said polymer having a molecular weight such that a 5 percent by weight aqueous solution thereof has a viscosity of at least about 200 centipoises at 20° C. and said solution being of such concentration that it has a viscosity of at least about 1 centipoise at the formation temperature, and thereafter introducing water into said input well under sufficient pressure to force said flooding medium through said formation toward at least one output well penetrating said formation at a distance from said input well, thereby displacing the oil in said formation by said flooding medium and in turn displacing said flooding medium by said water.

7. The process of claim 6 wherein the said polymer is a water-soluble homopolymer of an alkylene oxide selected from the class consisting of ethylene oxide, the propylene oxides and the butylene oxides.

8. The process of claim 6 wherein the volume of said flooding medium employed is between about 1 and about 10 percent of the hydrocarbon pore space of said formation.

9. The process of claim 6 wherein the said polymer is a water-soluble homopolymer of ethylene oxide.

10. The process of claim 6 wherein the said polymer is employed in such amount that the viscosity of said flooding medium at the formation temperature is between about 10 and about 1000 centipoises.

11. The process of claim 9 wherein the said polymer has a molecular weight such that a 1 percent by weight aqueous solution of the same has a viscosity between about 500 and about 4000 centipoises at 20° C.

12. Method for secondary recovery of oil from a formation by water flooding which comprises introducing into an input well penetrating the formation an aqueous solution of an ethylene oxide polymer having in excess of 10,000 ethylene units per molecule, whereby to form a flood front of relatively viscous liquid, thereafter introducing water into said input well and forcing fluid through the formation toward an output well, and withdrawing fluid including oil from the output well.

13. Method according to claim 12 wherein the concentration of said polymer in the aqueous solution is such that the solution has a viscosity of 100–1000 centipoises.

References Cited in the file of this patent

UNITED STATES PATENTS

| | | |
|---|---|---|
| 2,779,418 | Garst | Jan. 29, 1957 |
| 2,800,962 | Garst | July 30, 1957 |
| 2,827,964 | Sandiford et al. | Mar. 25, 1958 |
| 2,882,973 | Doscher et al. | Apr. 21, 1959 |